(12) United States Patent
Kuenzi et al.

(10) Patent No.: US 11,017,623 B2
(45) Date of Patent: *May 25, 2021

(54) ACCESS CONTROL SYSTEM WITH VIRTUAL CARD DATA

(71) Applicant: Carrier Corporation, Palm Beach Gardens, FL (US)

(72) Inventors: Adam Kuenzi, Silverton, OR (US); Jonah Harkema, Newberg, OR (US)

(73) Assignee: Carrier Corporation, Palm Beach Gardens, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/743,559

(22) Filed: Jan. 15, 2020

(65) Prior Publication Data

US 2020/0151986 A1    May 14, 2020

Related U.S. Application Data

(62) Division of application No. 15/528,887, filed as application No. PCT/US2015/063130 on Dec. 1, 2015, now Pat. No. 10,540,835.

(Continued)

(51) Int. Cl.
    *G07C 9/29*     (2020.01)
    *G07C 9/00*     (2020.01)
    (Continued)

(52) U.S. Cl.
    CPC .......... *G07C 9/29* (2020.01); *G07C 9/00571* (2013.01); *G07C 9/27* (2020.01); *H04L 9/14* (2013.01); *H04L 63/0428* (2013.01); *H04W 12/02* (2013.01); *H04W 12/04* (2013.01); *H04W 12/35* (2021.01); *H04W 4/80* (2018.02); *H04W 12/08* (2013.01); *H04W 88/02* (2013.01)

(58) Field of Classification Search
CPC ........ G07C 9/29; G07C 9/27; G07C 9/00571; H04W 12/0023; H04W 12/02; H04W 12/04; H04W 4/80
See application file for complete search history.

(56) References Cited

U.S. PATENT DOCUMENTS 6,717,528 B1   4/2004   Burleson et al.
7,315,823 B2   1/2008   Bröndrup
(Continued)

FOREIGN PATENT DOCUMENTS

CN    103021054 A    4/2013
CN    103026682 A1    4/2013
(Continued)

OTHER PUBLICATIONS

U.S. Non-Final Office Action dated Apr. 24, 2019 for U.S. Appl. No. 15/528,820.

(Continued)

*Primary Examiner* — Nabil H Syed
(74) *Attorney, Agent, or Firm* — Bachman & LaPointe, P.C.

(57) ABSTRACT

An access control system includes a mobile library on a mobile device operable to communicate with the credential service, the mobile library operable to receive the credential from the credential service and a credential module for an access control, the credential module operable to receive virtual card data from the credential, the virtual card data usable to operate the access control.

5 Claims, 5 Drawing Sheets

Related U.S. Application Data

(60) Provisional application No. 62/086,258, filed on Dec. 2, 2014.

(51) Int. Cl.
| | | |
|---|---|---|
| *H04W 12/04* | (2021.01) | |
| *H04W 12/02* | (2009.01) | |
| *G07C 9/27* | (2020.01) | |
| *H04W 12/30* | (2021.01) | |
| *H04L 9/14* | (2006.01) | |
| *H04L 29/06* | (2006.01) | |
| *H04W 4/80* | (2018.01) | |
| *H04W 12/08* | (2021.01) | |
| *H04W 88/02* | (2009.01) | |

(56) References Cited

U.S. PATENT DOCUMENTS

| | | |
|---|---|---|
| 7,821,395 B2 | 10/2010 | Denison et al. |
| 9,210,170 B1 | 12/2015 | Kim |
| 9,613,226 B2 | 4/2017 | Khassanov |
| 9,691,201 B2 | 6/2017 | Myers et al. |
| 2003/0093997 A1 | 5/2003 | Stalder et al. |
| 2008/0139116 A1 | 6/2008 | Balgard et al. |
| 2008/0163361 A1 | 7/2008 | Davis |
| 2009/0066476 A1 | 3/2009 | Raheman |
| 2009/0256676 A1 | 10/2009 | Piccirillo et al. |
| 2010/0176919 A1 | 7/2010 | Myers et al. |
| 2010/0283579 A1 | 11/2010 | Kraus et al. |
| 2010/0306549 A1 | 12/2010 | Ullmann |
| 2011/0311052 A1 | 12/2011 | Myers et al. |
| 2012/0060825 A1 | 3/2012 | Hensley et al. |
| 2012/0129451 A1 | 5/2012 | Métivier |
| 2012/0146918 A1 | 6/2012 | Kreiner et al. |
| 2012/0154108 A1 | 6/2012 | Sugaya |
| 2012/0157080 A1 | 6/2012 | Métivier |
| 2012/0201381 A1 | 8/2012 | Miller |
| 2012/0213362 A1 | 8/2012 | Bliding et al. |
| 2012/0280783 A1 | 11/2012 | Gerhardt et al. |
| 2013/0127593 A1 | 5/2013 | Kuenzi et al. |
| 2013/0176107 A1 | 7/2013 | Dumas et al. |
| 2013/0200999 A1 | 8/2013 | Spodak |
| 2013/0257589 A1 | 10/2013 | Mohiuddin et al. |
| 2013/0335193 A1 | 12/2013 | Hanson et al. |
| 2013/0342314 A1 | 12/2013 | Chen et al. |
| 2014/0028438 A1 | 1/2014 | Kuenzi et al. |
| 2014/0049364 A1 | 2/2014 | Ahearn et al. |
| 2014/0049370 A1 | 2/2014 | Eberwine et al. |
| 2014/0051425 A1 | 2/2014 | Ahearn et al. |
| 2014/0120905 A1 | 5/2014 | Kim |
| 2014/0145823 A1 | 5/2014 | Aase |
| 2014/0181508 A1 | 6/2014 | Tanizawa |
| 2014/0181955 A1 | 6/2014 | Rosati |
| 2014/0219453 A1 | 8/2014 | Neafsey et al. |
| 2014/0247111 A1 | 9/2014 | Elfstrom |
| 2014/0373111 A1 | 12/2014 | Moss et al. |
| 2014/0376747 A1 | 12/2014 | Mullet et al. |
| 2015/0170448 A1 | 6/2015 | Robfogel |
| 2015/0199863 A1 | 7/2015 | Scoggins |
| 2015/0221152 A1 | 8/2015 | Andersen |
| 2015/0228134 A1 | 8/2015 | Tehranchi et al. |
| 2015/0269797 A1 | 9/2015 | Kauffmann et al. |
| 2016/0014131 A1 | 1/2016 | Neafsey et al. |
| 2016/0036788 A1 | 2/2016 | Conrad |
| 2016/0036814 A1 | 2/2016 | Conrad et al. |
| 2016/0049024 A1 | 2/2016 | Johnson et al. |
| 2017/0255768 A1 | 9/2017 | Goh |
| 2017/0311161 A1 | 10/2017 | Kuenzi |
| 2017/0330226 A1 | 11/2017 | Kuenzi |
| 2017/0345236 A1 | 11/2017 | Kuenzi |
| 2017/0345237 A1 | 11/2017 | Kuenzi et al. |

FOREIGN PATENT DOCUMENTS

| | | |
|---|---|---|
| CN | 203361799 U | 12/2013 |
| CN | 104063930 A | 9/2014 |
| EP | 2620919 A1 | 7/2013 |
| MX | MX/a/2017/001090 A | 7/2017 |
| WO | 2013074301 A1 | 5/2013 |
| WO | 2016019064 A1 | 2/2016 |

OTHER PUBLICATIONS

U.S. Non-Final Office Action dated Aug. 29, 2019 for U.S. Appl. No. 15/528,820.
U.S. Non-Final Office Action dated Feb. 25, 2019 for U.S. Appl. No. 15/528,887.
U.S. Non-Final Office Action dated Oct. 11, 2019 for U.S. Appl. No. 15/528,896.
U.S. Final Office Action dated Feb. 18, 2020 for U.S. Appl. No. 15/528,896.
CN Office action dated Mar. 29, 2019 for Chinese Patent Application No. 201580065881.8.
CN Office action dated Mar. 29, 2019 for Chinese Patent Application No. 201580066030.5.
EP Office Action dated Nov. 22, 2019 for European Patent Application No. 15816969.8.
EP Office Action dated Oct. 28, 2019 for European Patent Application No. 15816966.4.
MX Office Action dated Jan. 10, 2019 for Mexican Patent Application No. MX/a/2017/007294.
MX Office Action dated Jan. 10, 2019 for Mexican Patent Application No. MX/a/2017/007292.
ISR for Application PCT/2015/063130 dated Feb. 11, 2016.
Chinese Office action dated Mar. 4, 2020 issued for Chinese Patent Application No. 2015800658729.
European Office action dated Nov. 9, 2020 issued for European Patent Application No. 15816966.4.
Tim Andersson; "Institutionen för datavetenskap Bluetooth Low Energy and Smartphones for Proximity-Based Automatic Door Locks", Jun. 8, 2014, XP055744496, URL:https://www.diva-portal.org/smash/get/diva2:723899/FULLTEXT01.pdf.

ACCESS CONTROL SYSTEM WITH VIRTUAL CARD DATA

CROSS-REFERENCE TO RELATED APPLICATION

This application is a divisional of U.S. patent application Ser. No. 15/528,887, filed May 23, 2017, which is a 371 of International Application PCT/US2015/063130, filed Dec. 1, 2015, which claims benefit of U.S. Provisional Patent Application Ser. No. 62/086,258, filed Dec. 2, 2014.

BACKGROUND

The present disclosure relates generally to access control systems, and more particularly, to a system and a method of opening a lock with virtual card data on a mobile device.

An access control system is typically operated by encoding data on a physical key card that indicates access rights. Some access control systems are online where the reader can use some means to communicate with the access control system. In online systems the access rights are usually a reference identifier. Other access control systems are offline and the access rights are encoded as data that can be decoded and interpreted by the offline lock to retrieve the access rights. An example is a hotel locking system where a front desk encodes a guest card and an offline, battery powered lock on a guest room door has the means to decode the card and permit or deny access based on the encoded access rights. Some methods of encoding access rights include sequencing where subsequent access rights have a sequence number that is greater than the prior access rights.

Some access control systems have utilized a device other than a physical key card to communicate with a lock, such as via audio tones from a mobile device, where there is also a separate method of indicating access rights that is different from the data on the key card. Such systems are partially effective in that a person can open the lock by either means. But because of the separate means for indicating access rights where the lock can not determine which access right was sequenced before the other access right, these systems do not allow use of the ubiquitous physical key card in conjunction with the mobile device. The advantage of using the virtual card data is that no synchronization is required between separate systems for indicating access rights, and the lock can have a unified audit trail.

SUMMARY

An access control system according to one disclosed non-limiting embodiment of the present disclosure includes a credential service operable to generate an encrypted mobile credential; a mobile library on a mobile device operable to communicate with the credential service, the mobile library operable to receive the encrypted mobile credential from the credential service; and a credential module for an access control, the credential module operable to extract virtual card data from the encrypted mobile credential, the virtual card data usable to operate the access control.

A further embodiment of the present disclosure includes, wherein the mobile device is operable to upload an audit trail.

A further embodiment of any of the foregoing embodiments of the present disclosure includes, wherein the audit trail is a unified audit trail.

A further embodiment of any of the foregoing embodiments of the present disclosure includes, wherein the audit trail includes the battery status of the access control.

A further embodiment of any of the foregoing embodiments of the present disclosure includes, wherein the credential module is operable to decrypt and validate the encrypted mobile credential by validating a digital signature.

A further embodiment of any of the foregoing embodiments of the present disclosure includes, wherein the credential module is operable to decrypt and validate the encrypted mobile credential by validating a starting date and an expiring date associated with the encrypted mobile credential.

A further embodiment of any of the foregoing embodiments of the present disclosure includes, wherein the credential module is operable to decrypt and validate the encrypted mobile credential by validating the source of the encrypted mobile credential.

A further embodiment of any of the foregoing embodiments of the present disclosure includes decrypting and extracting the virtual card data.

A further embodiment of any of the foregoing embodiments of the present disclosure includes, wherein the virtual card data is identical to a card meta-data physically encoded on a physical key card.

A further embodiment of any of the foregoing embodiments of the present disclosure includes, wherein the mobile library includes a set of mobile credentials generated by the credential service based on an access category in addition to a mobile credential with the virtual card data generated by the credential service for a specific access control.

A further embodiment of any of the foregoing embodiments of the present disclosure includes, wherein the mobile device includes a smartphone.

A further embodiment of any of the foregoing embodiments of the present disclosure includes, wherein the access control is a lock.

A further embodiment of any of the foregoing embodiments of the present disclosure includes, wherein the lock has additional means to read physical cards in addition to the credential module for reading virtual cards.

A further embodiment of any of the foregoing embodiments of the present disclosure includes wherein the lock operates offline.

A further embodiment of any of the foregoing embodiments of the present disclosure includes, wherein the access control is a unit operable to distribute a physical key card with card meta-data physically encoded therein, the virtual card data is identical to a card meta-data.

A further embodiment of any of the foregoing embodiments of the present disclosure includes, where the mobile device uploads an indication of the need to load more physical cards in a key dispenser.

A further embodiment of any of the foregoing embodiments of the present disclosure includes, wherein the key dispenser operates offline.

A method of managing credentials for a mobile device, the method according to another disclosed non-limiting embodiment of the present disclosure includes downloading an encrypted mobile credential to a mobile device; communicating the encrypted mobile credential to a credential module in an access control; decrypting and validating the encrypted mobile credential; extracting the virtual card data from the encrypted mobile credential; and communicating the virtual card data from the credential module to operate the access control as a "virtual card read."

A further embodiment of any of the foregoing embodiments of the present disclosure includes encapsulating card data in the encrypted mobile credential.

A further embodiment of any of the foregoing embodiments of the present disclosure includes retrieving the virtual card data in a digital form.

A further embodiment of any of the foregoing embodiments of the present disclosure includes using a software-to-software application programming interface (API) provided to request the virtual card data.

A further embodiment of any of the foregoing embodiments of the present disclosure includes, wherein the encrypted mobile credential was generated by relation to an access category in addition to a mobile credential with the virtual card data for a specific access control.

A further embodiment of any of the foregoing embodiments of the present disclosure includes decrypting and validating the encrypted mobile credential within a credential module.

A further embodiment of any of the foregoing embodiments of the present disclosure includes locating the credential module within the access control.

A further embodiment of any of the foregoing embodiments of the present disclosure includes locating a physical key card reader within the access control.

A further embodiment of any of the foregoing embodiments of the present disclosure includes, wherein the virtual card data is identical to card meta-data physically encoded on a physical key card for the physical key card reader.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

Various features will become apparent to those skilled in the art from the following detailed description of the disclosed non-limiting embodiment. The drawings that accompany the detailed description can be briefly described as follows.

DETAILED DESCRIPTION

Figure 1:
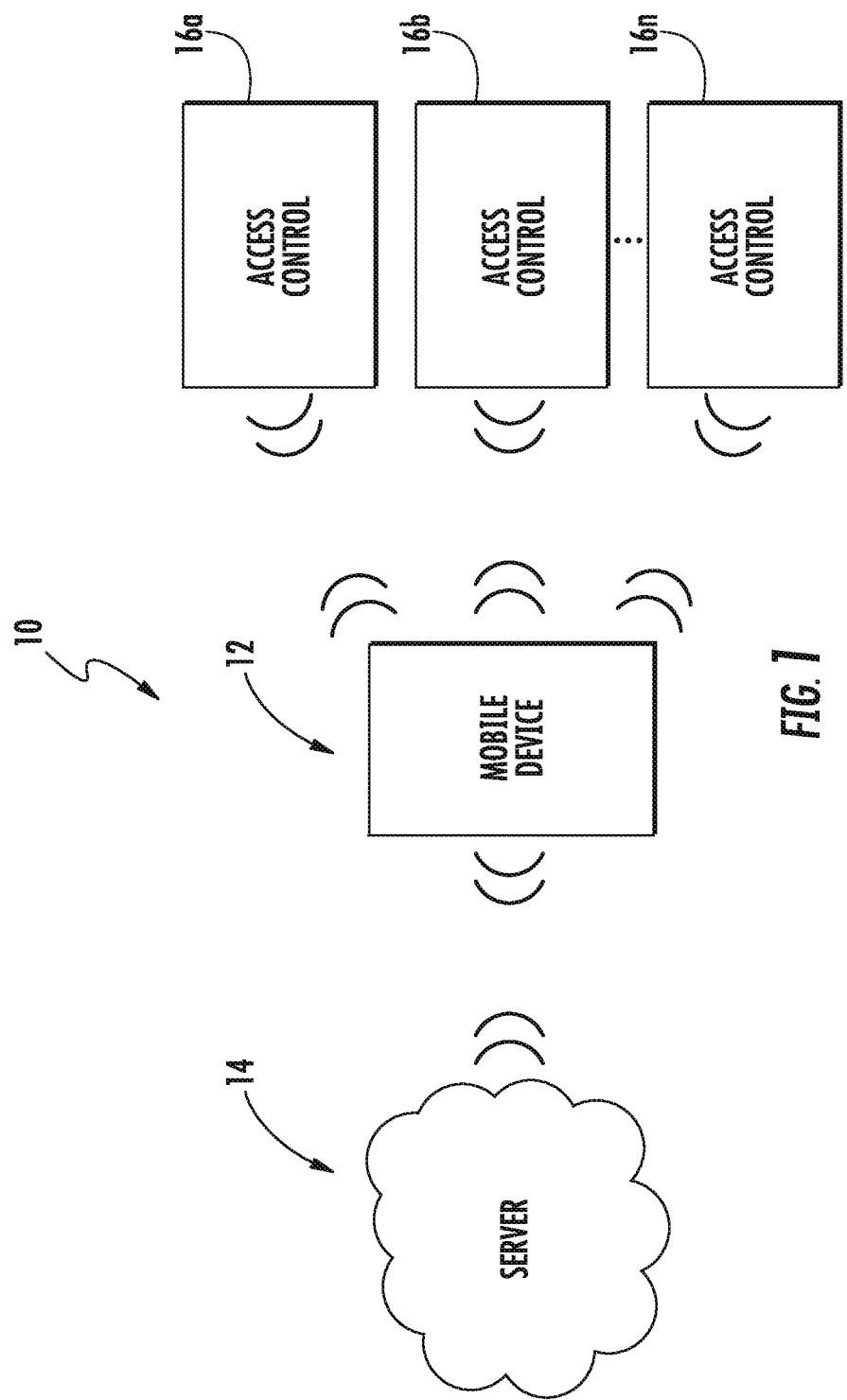
FIG. 1 is a general schematic system diagram of a user authentication system.

FIG. 1 schematically illustrates an access control system 10. The system 10 generally includes a mobile device 12, a server 14, and a plurality of access controls 16, schematically illustrated as 16a, 16b, . . . , 16n. It should be appreciated that, although particular systems are separately defined in the schematic block diagrams, each or any of the systems may be otherwise combined or separated via hardware and/or software.

The mobile device 12 is a wireless capable handheld device such as a smartphone, that is operable to communicate with the server 14 and the access controls 16. The server 14 may provide credentials and other data to the mobile device 12, such as firmware or software updates to be communicated to one or more of the access controls 16. Although the server 14 is depicted herein as a single device, it should be appreciated that the server 14 may alternatively be embodied as a multiplicity of systems, from which the mobile device 12 receives credentials and other data.

Each access control 16 is a wireless-capable, restricted-access, or restricted-use device such as wireless locks, access control readers for building entry, electronic banking controls, data transfer devices, key dispenser devices, tool dispensing devices, and other restricted-use machines. The mobile device 12 submits credentials to the access controls 16, thereby selectively permitting a user to access or activate functions of the access controls 16. A user may, for example, submit a credential to an electromechanical lock to unlock it, and thereby gain access to a restricted area. In another example, a user may submit a credential to an electronic banking control to withdraw funds. In still another example, the user may submit the credential to a unit that dispenses key cards with data associated with or data retrieved from the credential. A mobile device 12 may store credentials for one or all or other of the examples noted above, and in addition may store a plurality of credentials for each type of application at the same time. Some credentials may be used for multiple access controls 16. For example, a plurality of electronic locks in a facility may respond to the same credential. Other credentials may be specific to a single access control 16.

Figure 2:
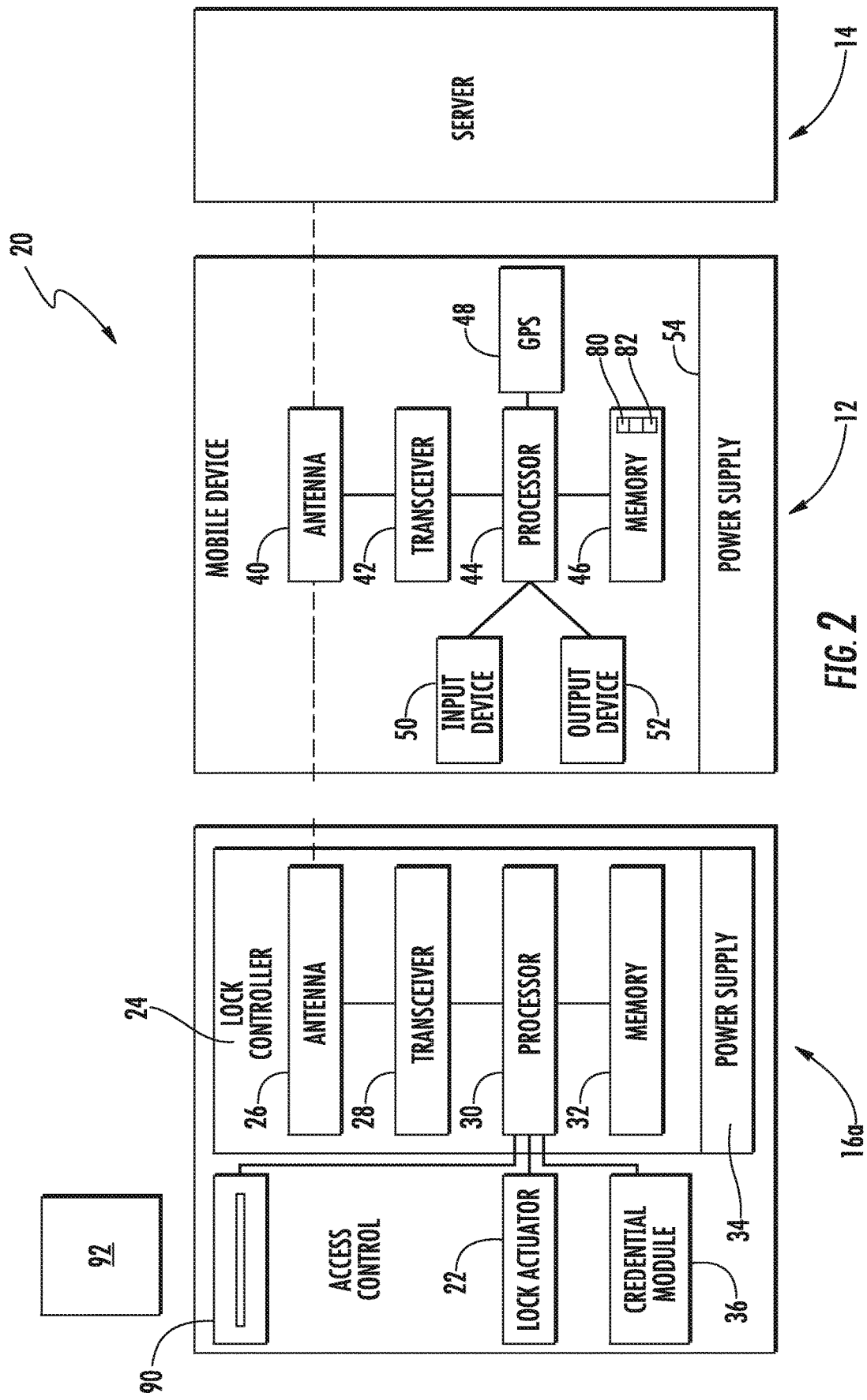
FIG. 2 is a block diagram of the user authentication system.

With reference to FIG. 2, a block diagram of an example electronic lock system 20 includes the access control 16a, the mobile device 12, and the server 14. The access control 16a generally includes a lock actuator 22, a lock controller 24, a lock antenna 26, a lock transceiver 28, a lock processor 30, a lock memory 32, a lock power supply 34, a lock card reader 90 and a credential module 36. The access control 16a is responsive to credentials from the mobile device 12, and may, for example, be the lock of a lockbox, a door lock, or a lock core. Although the present disclosure focuses primarily on credentials for access control, it should be appreciated that other systems wherein credentials are transmitted from a mobile device to an access control so as to identify the user to an online system or validate user access rights or permissions in an offline system will benefit herefrom. Such systems include virtual or electronic banking systems, machine operation systems, dispensing systems, and data access systems.

Upon receiving and authenticating an appropriate credential from the mobile device 12 using the credential module 36, or after receiving card data from lock card reader 90, the lock controller 24 commands the lock actuator 22 to lock or unlock a mechanical or electronic lock. The lock controller 24 and the lock actuator 22 may be parts of a single electronic or electromechanical lock unit, or may be components sold or installed separately.

The lock transceiver 28 is capable of transmitting and receiving data to and from at least the mobile device 12. The lock transceiver 28 may, for instance, be a near field communication (NFC), Bluetooth, or Wi-Fi transceiver, or another appropriate wireless transceiver. The lock antenna 26 is any antenna appropriate to the lock transceiver 28. The lock processor 30 and lock memory 32 are, respectively, data processing, and storage devices. The lock processor 30 may, for instance, be a microprocessor that can process instructions to validate card data and determine the access rights contained in the card data or to pass messages from a transceiver to a credential module 36 and to receive a response indication back from the credential module 36 with card data. The lock memory 32 may be RAM, EEPROM, or other storage medium where the lock processor 30 can read and write data including but not limited to lock configuration options and the lock audit trail. The lock audit trail may be a unified audit trail that includes events initiated by accessing the lock via the lock card reader 90 or the mobile device 12. The lock power supply 34 is a power source such as line power connection, a power scavenging system, or a battery that powers the lock controller 24. In other embodiments, the lock power supply 34 may only power the lock controller 24, with the lock actuator 22 powered primarily or entirely by another source, such as user work (e.g. turning a bolt).

The credential module 36 is in communication with the lock processor 30 and is operable to decrypt and validate a credential to extract virtual card data communicated into the lock controller 24 as a "virtual card read." That is, the access control 16a has essentially two readers, one reader 90 to read a physical key card 92 and the credential module 36 to communicate with the mobile device 12 via the lock processor 30 and the transceiver 28 and antenna 26.

While the figure shows the lock antenna 26 and the transceiver 28 connected to the processor 30, this is not to limit other embodiments that may have additional antenna 26 and transceiver 28 connected to the credential module 36 directly. The credential module 36 may contain a transceiver 28 and antenna 26 as part of the credential module. Or the credential module 36 may have a transceiver 28 and antenna 26 separately from the processor 30 which also has a separate transceiver 28 and antenna 26 of the same type or different. In some embodiments, the processor 30 may route communication received via transceiver 28 to the credential module 36. In other embodiments the credential module may communicate directly to the mobile device 12 through the transceiver 28.

The mobile device 12 generally includes a key antenna 40, a key transceiver 42, a key processor 44, a key memory 46, a GPS receiver 48, an input device 50, an output device 52, and a key power supply 54. The key transceiver 42 is a transceiver of a type corresponding to the lock transceiver 28, and the key antenna 40 is a corresponding antenna. In some embodiments, the key transceiver 42 and the key antenna 40 may also be used to communicate with the server 14. In other embodiments, one or more separate transceivers and antennas may be included to communicate with server 14. The key memory 46 is of a type to store a plurality of credentials locally on the mobile device 12. In other embodiments, the mobile device 12 communicates with the server 14 at the same time as it communicates to the access control 16a. This is the online configuration and in this embodiment a mobile credential is retrieved in real time and is passed to the credential module 36 without storing first in the key memory 46 on the mobile device 12.

Figure 3:
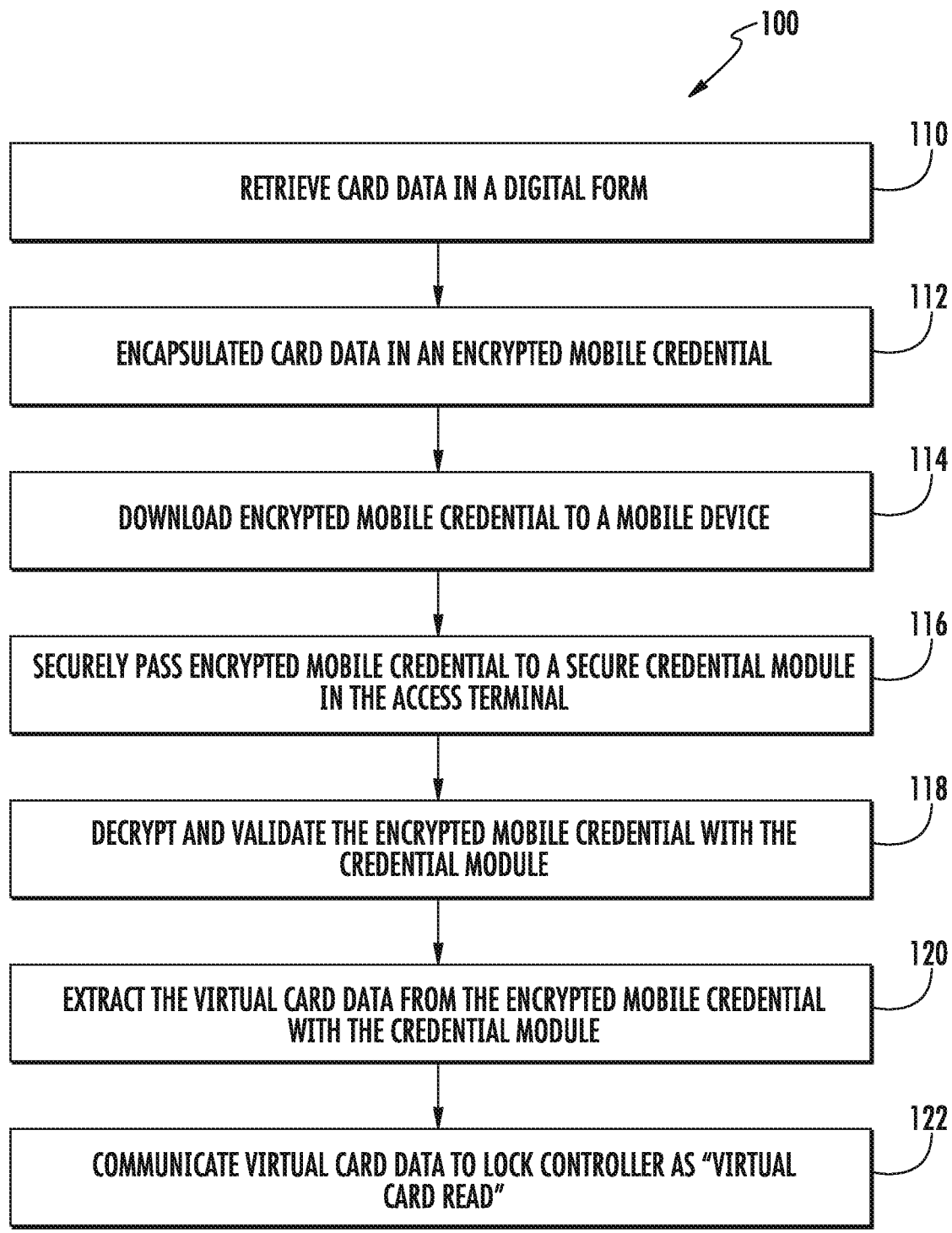
FIG. 3 is a flowchart of a credential management method performed by the user authentication system.

With reference to FIG. 3, a method 100 to facilitate communication of a credential representative of data that would normally be physically encoded on the key card 92 is retrieved in a digital form (step 110), encapsulated in an encrypted credential (step 112), downloaded to the mobile device 12 (step 114), securely passed to the credential module 36 (step 116) that decrypts and validates the credential (step 118), extracts the virtual card data (step 120), then passes the virtual card data into the lock controller 24 as a "virtual card read" (step 122). This, for example, permits a user to bypass a front desk of a hotel and go directly to their room as will be further described. The encrypted credential may be generated by the server 14 using well known techniques for digital certificate creation and encryption using cryptographic algorithms such as AES, ECC, RSA, and the like. For example, the credential may contain but is not limited to including a credential identifier, a parameter indicating the type or format of the credential, it may contain encrypted data such as the virtual card data, and it may contain a digital signature. The encrypted data may be encrypted with an AES-128 encryption key that can be known to the credential module 36. Or it may be encrypted with a derived encryption key that can be determined from information contained in the credential. Further, the digital signature may be a CBC-MAC type signature based on an AES-128 encryption key, for example, that can be known by the credential module 36. Or, it could be a digital signature based on a private key known to the server 14 and can be validated by a public key known to the credential module 36.

Figure 4:
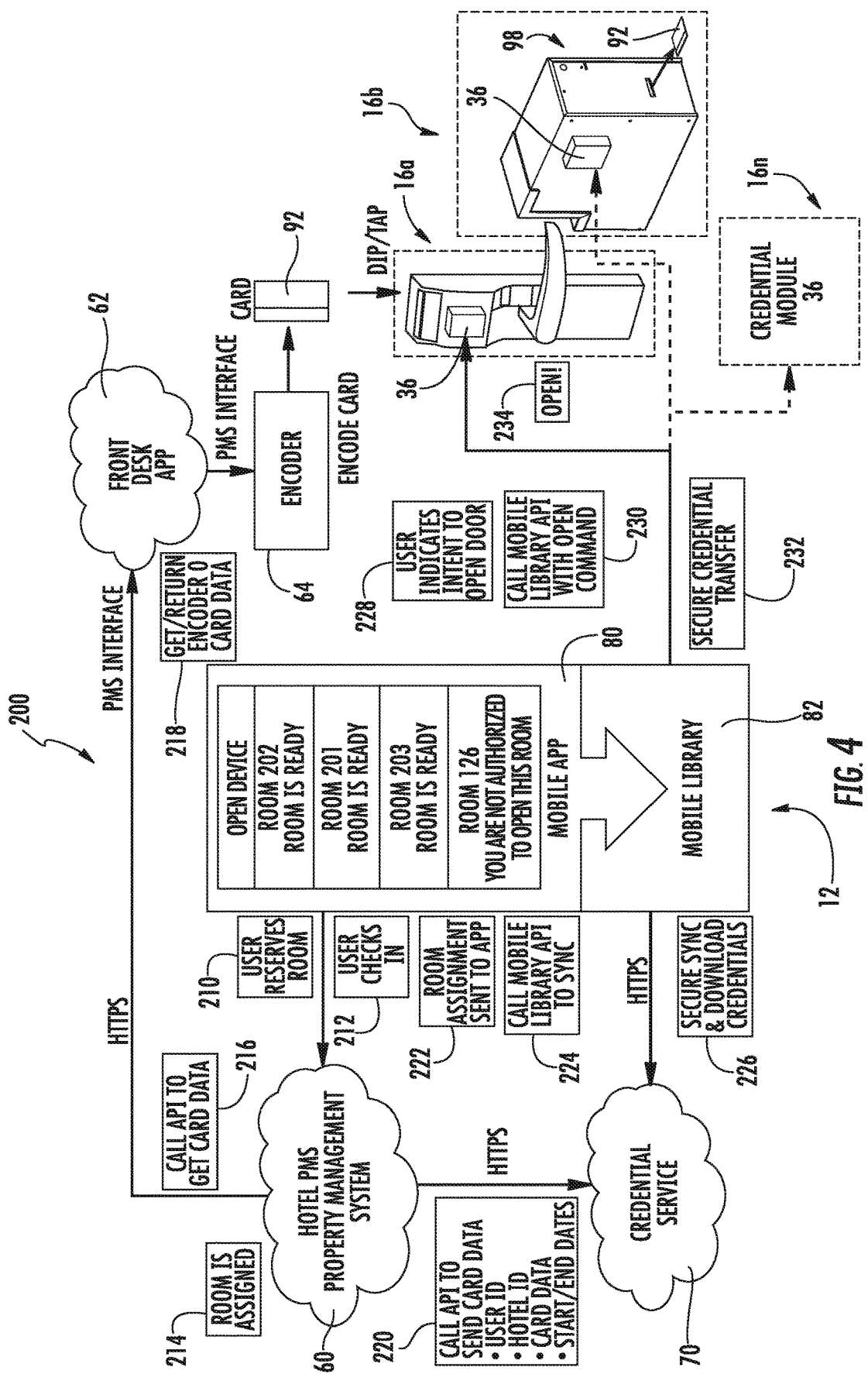
FIG. 4 is a flowchart of a credential management method performed by the user authentication system according to one disclosed non-limiting embodiment.

With reference to FIG. 4, one example bypass the front desk method 200, is initiated by a user who first reserves a hotel room (step 210) through any process supported by a hotel, such as mobile reservations, web sites, travel agents, etc. Later, a check-in procedure confirms their stay (step 212). Again, this can be performed through any process supported by the hotel.

Next, a room is assigned in a hotel property management system 60 based on the guest preferences (or room selection) and the room availability on check-in (step 214). The hotel property management system 60 may use a software-to-software application programming interface (API) provided by a front desk application 62 to request card data in a digital form (step 216). The front desk application 62 may range from a stand-alone encoder 64 to a complete software package running in a cloud that is operable to encode a virtual card for the room that was selected and return the virtual card data back to the hotel system (step 218).

Next, the hotel property management system 60 will make another software-to-software API call to a credential service 70 after the hotel system has authenticated the user and has allocated a room stay reservation (step 220). The pertinent information is communicated to the credential service 70 with an indication to include, for example, what hotel property, what room, what guest (e.g. User ID), what dates and also the virtual card data for the stay.

Simultaneous, or in sequence with sending the virtual card data to the credential service 70, the hotel property management service 60 communicates an indication to the user (again, through any conventional method) that the check-in is confirmed and the room is assigned (step 222).

Next, a mobile device 12 based hotel loyalty mobile application 80 will utilize a software-to-software API in a mobile library 82 (step 224) to download credentials from the credential service 70 (step 226). The mobile library 82 will securely authenticate to the credential service 70 with a prior established shared secret that may change on every successful connection.

Once authenticated, the credential service 70 generates at the time of the communication from the mobile library 82 the credentials for the user and encrypts into the credentials the virtual card data received in step 220 for the guest associated with this instance of the mobile library. One credential is generated for each door or access point and the virtual card data will be the same in each of these separate credentials, but may be encrypted with a unique key for the particular door or access point. The method of encryption may be AES, 3DES, or other such encryption method. The method and type of credential used may be a compressed digital certificate or a standard based certificate like X.509 or other certificate format known to the art. That is, for example, the virtual card data is encrypted into the credential with a unique key known by the credential module 36 and by the credential service 70.

The mobile library 82 will download and store the list of credentials on the mobile device 12 using native OS protections and additional encryption of data with device specific information, e.g., UDID, IMEI, IMSI, MAC addresses, etc. Now that the check-in is complete and the encrypted mobile credential (with virtual card data) is resident on the mobile device 12 (FIG. 2), the user can operate the access control 16 in an offline mode at any later time without the mobile device 12 being required to be connected to the credential service 70. Additional embodiments may have the mobile device 12 download a credential at the same time mobile device is communicating to access control 16 at the same time the user wishes to access their room, for example.

When the user wishes to access their room (step 228), the user indicates such intent through a gesture, a click of a button, a tap on the screen, a finger print read, password, proximity to the lock, touching the lock, etc. In response to this, intent, the hotel loyalty mobile application 80 again calls the software-to-software API in the mobile library 82 to initiate the secure transfer of the encrypted mobile credential to the access control 16 (step 230). While the loyalty application 80 initiates the transfer, the mobile library implements the secure transfer separately in the next step.

Secure transfer of the credential (step 232) may start with a process of the mobile library 82 listening for a signal advertisement such as Bluetooth low energy (BTLE) advertisements from in-range access controls 16. That is, the access controls 16 are advertising their presence on a periodic rate with advertisement data that indicates an identifier of the access control 16 and the mobile device 12 can listen and connect automatically without the person having to push a button to wake-up a sleeping, battery powered lock 16 or to get out of a vehicle to interact with a reader access point on a garage door or other device. The reader access point is another type of lock 16. Another embodiment is to use Near Field Communication (NFC) and the person 'taps' their mobile device to the lock 16 and a secure credential exchange transfers the mobile credential to the access control 16 (step 232). Secure credential exchanges can be done using standard techniques such as establishing a session key, encrypting communication messages, and validating the authenticity of message sender and receiver.

In the preferred embodiment where the access control advertises using Bluetooth low energy (BTLE), the mobile library 82 filters the received advertisements based on the received identifier of the access control 16 and by comparing with identifiers contained in or associated with each credential in the list of mobile credentials and based on the user intent to access a particular room. Once an advertisement is received for a target access control 16, the mobile library 82 initiates a wireless connection, and performs a secure transfer of the encrypted mobile credential (step 232). The secure transfer may utilize a unique session encryption key and standard cryptographic algorithms and techniques. It should be appreciated that the data can be securely transmitted over any wireless link, to include but not be limited to BTLE, zigbee, Near Field Communication, etc.

The credential module 36 will receive the encrypted mobile credential, then validate and decrypt the encrypted mobile credential to retrieve the virtual card data. The decryption and validation may include, but not be limited to, validating a digital signature, validating the type of the credential, validating that the credential identifier matches an identifier in the lock memory 32, validating a starting date and an expiring date of the credential, validating the source of the credential, etc. (step 118; FIG. 3). Once validated and decrypted, the virtual card data is extracted (step 120; FIG. 3).

The virtual card data is then communicated via hardware and software interfaces, depending on embodiments, to the lock controller 24 which may further decrypt the virtual card data, processes the data based on lock vendor rules, then open the lock if entry is permitted (step 234). Notably, the virtual card data is communicated into the lock controller 24 as a "virtual card read" in a data format equivalent to that of a physical key card. This thus permits the continued usage of traditional guest key cards 92 such as that of a family member, or a guest that just wants a copy of the physical key card 92, along with usage of the mobile device 12.

The audit trail uploaded by the mobile device 12 can be just the audits generated by the mobile device 12 itself, or can be the unified audits including openings by the guest using a physical key card. In addition, when the lock 16 is opened, a battery status or other maintenance information thereof may be uploaded into the audit trail from the mobile device 12 to the credential service 70 so that the hotel can be notified of low battery conditions and proactively change the batteries, or perform other maintenance. Other information associated with the audit trail can include, for example, failed openings or failed attempts or credentials that failed validation.

Usage of the "virtual card read" maintains a contiguous audit trail and also maintains all the known use cases for access control that are already encoded into traditional card data. Furthermore, the credential module 36 is lock vendor agnostic, so that any lock vendor's data could be passed through to allow each lock vendor to independently innovate card data. Further, the credential module 36 may be supplied by a different company than the lock 16. And also, the server 14, mobile device 12, and credential module 36 may have no means for further decrypting or validating the card data other than treating it like a data object to be encoded, encrypted, transferred, retrieved and delivered. Additionally, the "virtual card read" can be used offline without requiring the mobile device 12 to be online with a Wi-Fi connection or real time connection to a credential service. That is, the data for the "virtual card read" is stored on the mobile device 12 and passed securely to the credential module 36 in an offline mode. This is not to limit the capability to also send the "virtual card read" in an online mode. An additional benefit is that any access controls 16 can use any card types in addition to using a credential module 36, where the card types include but are not be limited to, Magnetic strip, RFID, Proximity, etc.

In another disclosed non-limiting embodiment, the credential module 36 can be used for many purposes, to include, but not be limited to, passing data to a self-service hard-key dispenser unit 98 that produces physical key cards 92. The hard-key dispenser unit 98 has a credential module 36 that receives the virtual card data, decrypts, extracts and sends to a lock controller 24 configured to encode the data onto a physical key card 92. That is, the virtual card data on the mobile device 12 is written to a physical key card 92 by the unit 98 and dispenses the key card 92 in an automated manner. The unit 98 does not require any user interface besides the dispensing element for the key card 92 and a unit power source, including but not limited to batteries, mains power, energy harvesting, and the like. The user interface for the unit 98 is really the interface of the mobile device 12. When the unit 98 begins to run low on blank key cards 92, the mobile device 12 can upload to the credential server 70 an indication of the status that can be turned into a report to notify the hotel that the unit 98 needs to be refilled.

In other disclosed non-limiting embodiments, the virtual card data can be standard access control card data (i.e. identification data) for badge access systems, or integrated into a vending machine with the virtual card data as credit card information, tokens, purchase reference identifiers, or the like.

Figure 5:
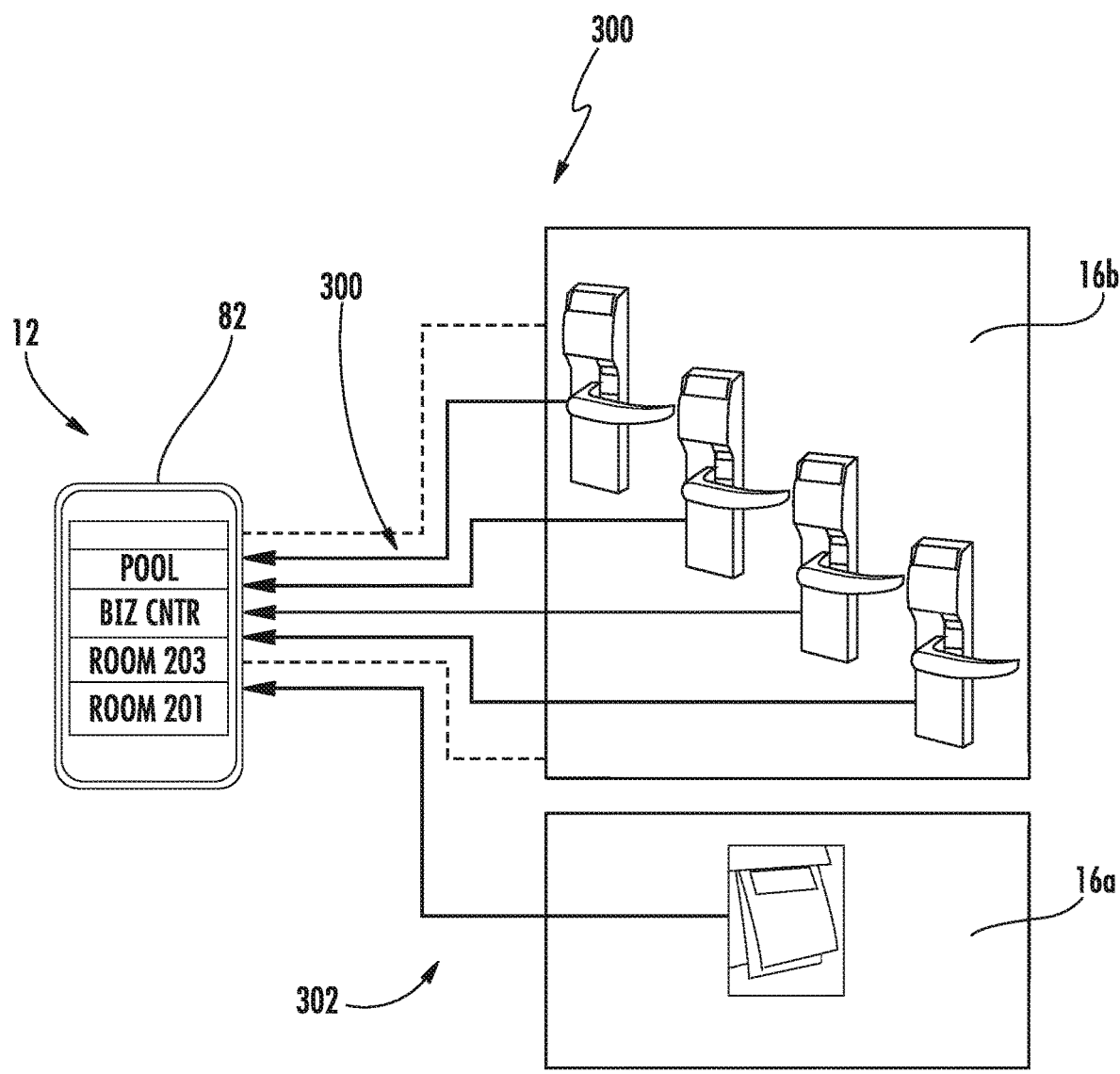
FIG. 5 is a schematic view of a credential according to another disclosed non-limiting embodiment.

With reference to FIG. 5, the mobile library 82 may include a set of mobile credentials that were generated by the credential service 70 based on access categories 300 (implicit permission) in addition to the mobile credential with virtual card data (explicit permission) 302 that was generated by the credential service 70 for a specific access control 16a. The access categories 300 operate to grant the user access to a particular grouping of access controls 16b that have collective meaning. For example, one access category could be 'Public Rooms' for access to a pool, business center, elevator, and wall readers. In the context of a hotel reservation, when the mobile device 12 communicates with the credential service 70 to download the encrypted mobile credential, the credential service 70 generates credentials for each lock in one or more access categories that the guest has been granted access. The encrypted mobile credential will thus have the same virtual card data encoded specifically for each specified access point, e.g., pool, business center, etc. and may optionally have the access category downloaded in or with the credential. However each mobile credential will be encrypted separately with a unique key for each access control 16b.

Provision and use of the access category 300 by the credential service 70 facilitates the efficient management of multiple access controls 16b in a system where the mobile device 12 can open multiples of locks where the mobile device 12 has a specific credential for each lock. This is simpler when compared to that which is conventionally required, e.g., two access control systems—one for the hotel system that generates the virtual card data with all the current art for hotel system access business rules, and a second one for granting access with a mobile credential to each access point, e.g., guest room, wall readers, pool, business lounge, etc. In other words, the business rules for the hotel system would need to be duplicated in the credential service.

The access category 300 allows for multi-vendor integration and can work separately from the hotel system access business rules that get encoded into virtual card data. The mobile credentials are thus an additional 'layer' of security "on top" of the virtual card data. The access category 300 also allows for relatively more simple maintenance procedures, such as, for example, when a lock in the 'Public' Access Category is replaced, the replacement lock need only be assigned to the same access category. However, a mobile device 12 would still need to communicate again to the credential service 70 for a new set of mobile credentials to be downloaded. No further administration is required on the part of the guest or system besides including the replacement lock in the correct access category and all guest permissions will continue to work seamlessly without modification even though the new lock has unique encryption keys from the prior lock.

The elements described and depicted herein, including in flow charts and block diagrams throughout the figures, imply logical boundaries between the elements. However, according to software or hardware engineering practices, the depicted elements and the functions thereof may be implemented on machines through computer executable media having a processor capable of executing program instructions stored thereon as a monolithic software structure, as standalone software modules, or as modules that employ external routines, code, services, and so forth, or any combination of these, and all such implementations may be within the scope of the present disclosure.

The use of the terms "a," "an," "the," and similar references in the context of description (especially in the context of the following claims) are to be construed to cover both the singular and the plural, unless otherwise indicated herein or specifically contradicted by context. The modifier "about" used in connection with a quantity is inclusive of the stated value and has the meaning dictated by the context (e.g., it includes the degree of error associated with measurement of the particular quantity). All ranges disclosed herein are inclusive of the endpoints, and the endpoints are independently combinable with each other.

Although the different non-limiting embodiments have specific illustrated components, the embodiments of this invention are not limited to those particular combinations. It is possible to use some of the components or features from any of the non-limiting embodiments in combination with features or components from any of the other non-limiting embodiments.

It should be appreciated that like reference numerals identify corresponding or similar elements throughout the several drawings. It should also be appreciated that although a particular component arrangement is disclosed in the illustrated embodiment, other arrangements will benefit herefrom.

Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

What is claimed:

1. A credential module within an access control, comprising:
a transceiver that advertises a presence on a periodic rate with an advertisement data that indicates an identifier of the access control such that a mobile library can compare the identifier of the access control with an identifier in an encrypted mobile credential in the mobile library, the encrypted mobile credential comprising an identifier and virtual card data, a credential service operable to generate a set of encrypted mobile credentials from a permission, wherein the permission specifies access rights for a user to an access control and an access category, and the access category is associated with one or more additional access controls so that the set contains encrypted mobile credentials for the access control, the credential module operable to extract the virtual card data from the encrypted mobile credential and send the virtual card data to a processor; and a processor in communication with the transceiver, the processor operable to decrypt and validate the encrypted mobile credential by validating a starting date and an expiring date associated with the encrypted mobile credential, the virtual card data then communicated to an access control controller prior to operation of the access control controller.

2. The credential module as recited in claim 1, further comprising decrypting and validating the encrypted mobile credential within a credential module that contains the processor.

3. The credential module as recited in claim 2, further comprising locating a physical key card reader within the access control.

4. The credential module as recited in claim 3, wherein the virtual card data is identical to card meta-data physically encoded on a physical key card for the physical key card reader.

5. The credential module as recited in claim 1, wherein the credential module is within an access control.

\* \* \* \* \*